United States Patent [19]

Wagner

[11] Patent Number: 5,011,274
[45] Date of Patent: Apr. 30, 1991

[54] EYEGLASS FRAME COMPRISING A SCREW JOINT WHICH IS PROTECTED FROM BECOMING LOOSE

[75] Inventor: Reiner Wagner, Ispringen, Fed. Rep. of Germany

[73] Assignee: OBE-Werk Ohnmacht & Baumgartner GmbH & Co. KG, Ispringen, Fed. Rep. of Germany

[21] Appl. No.: 439,289

[22] Filed: Nov. 20, 1989

[30] Foreign Application Priority Data

Apr. 17, 1989 [DE]  Fed. Rep. of Germany ... 8904802[U]

[51] Int. Cl.$^5$ .......................... G02C 5/14; G02C 5/22; G02C 1/08
[52] U.S. Cl. ..................................... 351/121; 351/153; 351/90
[58] Field of Search .......... 351/141, 153, 121, 90–102; 411/6, 168, 169, 399, 955, 960; 16/228

[56] References Cited

U.S. PATENT DOCUMENTS 2,833,325  2/1954  Laisy ..................................... 411/960
3,427,681  2/1969  Smith, Jr. .............................. 351/141

Primary Examiner—Rodney B. Bovernick
Attorney, Agent, or Firm—Dvorak and Traub

[57] ABSTRACT

This invention relates to an eyeglass frame comprising members, particularly hinge members, which are connected by a screw joint which is protected from becoming loose. The screw joint comprises a single metal part, which consists of a screw, which does not tend to become seized and to become clamped in the relatively movable hinge eyes. Because plastic parts are not required in the joint, the screw may remain installed during soldering work. This is accomplished in that the screw has a conical head portion which tapers with an included angle of 20 to 40 degrees, preferably 30°, and when the screw has been screwed into the frame the head of the screw extends in a conical opening in a member of the frame and in said opening defines with said frame member a clearance angle of 1 to 3 degrees and a clearance space axially adjoining the head. In such a joint the screw can firmly be tightened so that the high friction will prevent the screw from becoming loose spontaneously. On the other hand, the application of an excessive pressure per unit of area to the hinge eyelets will be avoided.

7 Claims, 1 Drawing Sheet

EYEGLASS FRAME COMPRISING A SCREW JOINT WHICH IS PROTECTED FROM BECOMING LOOSE

BACKGROUND OF THE INVENTION

1. Field of the Invention

This invention relates to an eyeglass frame comprising members, particularly hinge members, which are connected by a screw joint which is protected from becoming loose.

2. Description of the Prior Art

It is known that this object can be accomplished by plastic elements which control the friction between the parts of the joint. Such means consisting of plastic have been disclosed, e.g., in German patent specification No. 23 56 818 but must be removed when soldering work is to be performed on the eyeglass frame and must subsequently be inserted again. Screws provided with restraining means which consist entirely of metal have already been used and have been described, e.g., in German Utility Model 86 26 588 and Austrian patent specification No. 386,486. But such restraining means are provided with nuts, so that they are bipartite and in accordance with the last-mentioned reference said restraining means comprise a conical member, which is inserted into mating eyelets of the hinge so that inaccurate fits may result in a clamping of the hinge. From German patent specification No. 89 49 18 it is known in small hinges to provide a conical screw head which fits a conical opening in a member of the frame. In that case the resulting joint can be intentionally loosened only with difficulty, particularly if the screw has been firmly tightened, and such tightening and loosening will usually damage the head of the screw adjacent to the groove so that the screw cannot be re-used.

SUMMARY OF THE INVENTION

It is an object of the invention to provide such restraining means which consist only of a metal screw and which will not become seized and will not be clamped in the relatively movable hinge eyelets and which does not require the use of plastic material so that it may remain installed when soldering is to be performed.

In an eyeglass frame comprising members, particularly hinge members, which are connected by a screw joint, which is protected from becoming loose, that object is accomplished in accordance with the invention that the head of the screw is conical and has an included angle of 20 to 40 degrees, particularly of 30 degrees, and is adapted to be screwed into one member of the frame so that the head of said screw extends in a conical opening of said one member of the frame, which conical opening has such a taper that a clearance angle of 1 to 3 degrees is defined in said conical opening between said conical head and said one frame member. In that case a strong tightening of the screw will result in a friction which is so high that a spontaneous loosening of the screw will be prevented and an excessively high pressure applied per unit of area of the hinge eyelets will also be avoided. The hinge will easily be operable but the screw joint will be protected from becoming loose. In such a joint the tensile load on the screw threads will be low and the pressure per unit of area applied to the sliding surfaces of the hinge owing to the axial tightening of the screw will be low and will uniformly be distributed. Owing to the clearance angle between the conical head and the conical opening the forces exerted in the outer portion of the conical opening will be much stronger than in the inner portion so that a compressive stress will arise in the outer portion and will result in a favorable distribution of the forces exerted on the sliding surfaces of the hinge.

DETAILED DESCRIPTION OF THE PREFERRED EMBODIMENT

Figure 1:
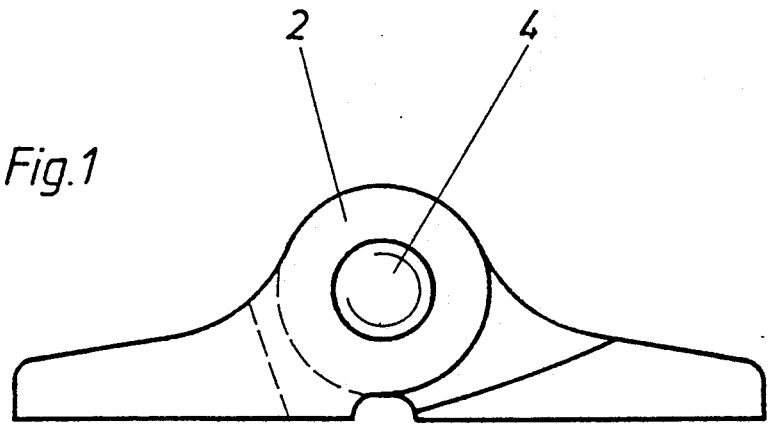
FIG. 1 is a side elevation showing a new eyeglass frame.

Details of an eyeglass frame provided in accordance with the invention with a screw joint which is protected from becoming loose are apparent from the drawing, which illustrates a preferred embodiment, which will now be described.

The eyeglass hinge shown in the drawing consists of three frame members, namely, of the two outer hinge eyelets 1 and 2, which may constitute bow-side or rim-side hinge members, and an intermediate hinge eyelet 3, which may constitute a rim-side or bow-side hinge member.

The hinge-screw comprises a screw-threaded shank 4 and a conical head portion 5, which tapers toward the shank 4 with an included angle between 20 and 40 degrees, in the present case with a preferred angle of 30 degrees. That head portion 5 extends in a conical opening 6, which tapers in the same direction and defines with the conical head portion 5 of the screw a clearance angle of 1 to 3 degrees.

In the embodiment shown by way of example the conical opening 6 is formed in an outer hinge eyelet 1 and the head portion 5 extending in the opening 6 defines in said opening 6 with the hinge eyelet 1 a clearance space 7 around the shank 4.

The other outer hinge eyelet 2 is formed with a tapped bore 8.

Figure 2:
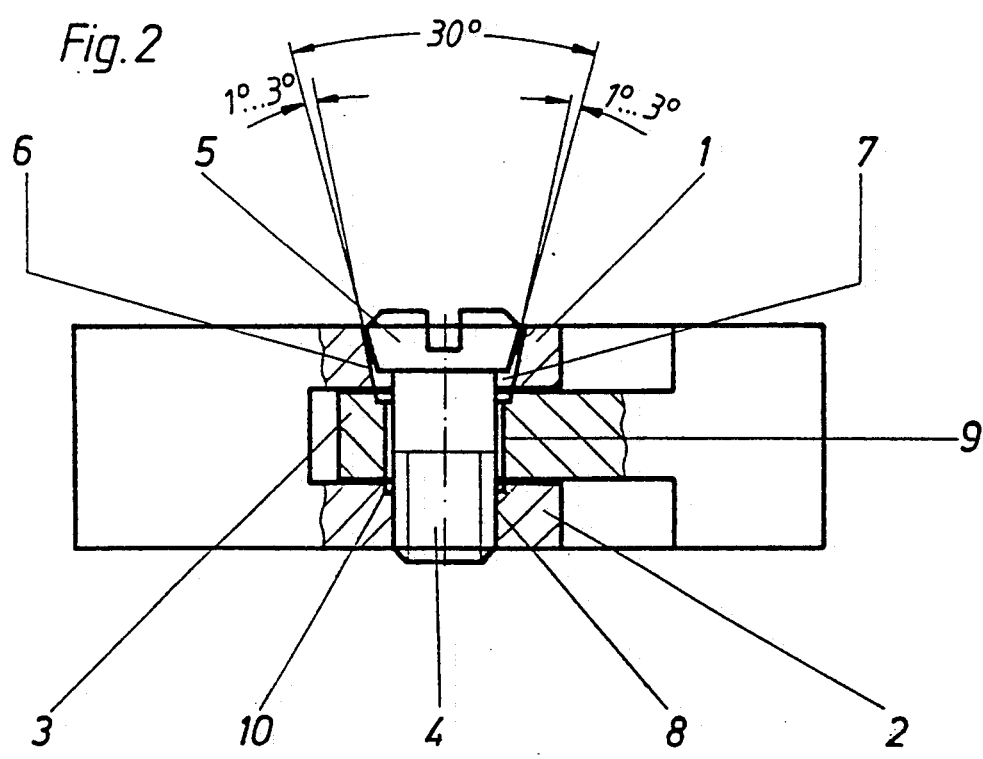
FIG. 2 is a transverse sectional view showing the frame of FIG. 1.

The shank 4 can be inserted through the conical opening 6 of the outer hinge eyelet 1 and through an untapped bore 9 in the intermediate hinge eyelet 3, which is disposed between the outer hinge eyelets 1 and 2, into the tapped bore 8 and can be screwed into the latter until the conical head portion 5 at its top engages the outer hinge eyelet 1 in the conical opening 6. The conical head portion 5 occupies one-half to two-thirds of the volume of the conical opening 6, as best viewed in FIG. 2. In that position the untapped bore 9 communicates with the clearance space 7 and with an untapped portion of the tapped bore 8.

The arrangement which has been described and shown permits a firm tightening of the screw so that the high friction between conical surfaces will prevent the screw from spontaneously becoming loose whereas the application of an excessive pressure per unit of area of the hinge eyelets will be avoided.

The screw having a conical head which is illustrated here may be used not only in three-part eye-glass hinges but may also be used in five-part eyeglass hinges. Advantages will generally be afforded by the use of the screw joint in eyeglass frames comprising a screw joint which is to be protected from becoming loose, for instance, in connection with closing blocks.

I claim:

1. In an eyeglass frame comprising at least two frame members, one of which is formed on opposite sides with a tapped bore and with a conical opening, which tapped bore and conical opening are axially aligned and open toward each other, and a screw having a screw-threaded shank, which is screwed into said tapped bore, and a conical head portion, which tapers toward said shank and extends into said conical opening and engages said one frame member in said conical opening, the improvement residing in that said conical head portion tapers with an included angle of 20 to 40 degrees and defines with said one frame member in said conical opening a clearance angle of 1 to 3 degrees and a clearance space which surrounds said shank.

2. The improvement set forth in claim 1, wherein said conical head portion tapers with an included angle of 30°.

3. The improvement set forth in claim 1, in which said at least two frame members constitute hinge members.

4. The improvement set forth in claim 3, wherein said one frame member comprises axially spaced apart two outer hinge eyelets, which are formed with said tapped bore and with said conical opening, respectively, an additional frame member consists of an intermediate hinge eyelet, which extends between said two outer hinge eyelets and is formed with an untapped opening, which communicates with said conical opening and with said tapped bore, and said shank extends through said untapped opening in said intermediate hinge eyelet into said tapped bore.

5. The improvement set forth in claim 4 as applied to an eye-glass frame comprising a rim and two bows, each of which is hinged to said rim by one of said hinges, wherein said intermediate hinge eyelet of each of said hinges is connected to said rim and said outer hinge eyelets of each of said hinges are connected to one of said bows.

6. The improvement set forth in claim 4, wherein said tapped bore has an untapped portion, which communicates with said untapped opening in said intermediate hinge eyelet and said untapped opening in said intermediate hinge eyelet communicates with said clearance space.

7. The improvement set forth in claim 1, wherein said conical head portion occupies one-half to two-thirds of the volume of said conical opening in said one frame member.

* * * * *